(12) United States Patent
Tohyama et al.

(10) Patent No.: US 6,711,345 B1
(45) Date of Patent: Mar. 23, 2004

(54) DATA STREAM RECORDING/REPRODUCING APPARATUS, RECORDING/REPRODUCING METHOD, AND RECORDING MEDIUM

(75) Inventors: Yasuaki Tohyama, Osaka (JP); Etsuto Nakatsu, Osaka (JP); Atsuo Ochi, Osaka (JP); Naoshi Usuki, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/424,813

(22) PCT Filed: Mar. 31, 1999

(86) PCT No.: PCT/JP99/01708
§ 371 (c)(1),
(2), (4) Date: Mar. 21, 2000

(87) PCT Pub. No.: WO99/52100
PCT Pub. Date: Oct. 14, 1999

(30) Foreign Application Priority Data

Mar. 21, 1998 (JP) .............................................. 10-85709

(51) Int. Cl.⁷ ........................... H04N 5/91; G11B 27/00
(52) U.S. Cl. ............................................. 386/68; 80/59
(58) Field of Search ............................. 368/68, 67, 69, 368/81, 80, 6, 46, 1, 95, 78, 79, 59; 360/55, 69, 71, 72.1, 72.2, 72.3, 73.12, 73.13, 27

(56) References Cited

U.S. PATENT DOCUMENTS 5,377,051 A * 12/1994 Lane et al.
6,483,984 B1 * 11/2002 Hirose

FOREIGN PATENT DOCUMENTS

| JP | 5-325512 | 12/1993 |
| JP | 6-230964 | 8/1994 |
| JP | 08-096451 | 4/1996 |
| JP | 8-298641 | 11/1996 |

OTHER PUBLICATIONS

Japanese language search report for Int'l Appln No. PCT/JP99/01708 dated Jul. 6, 1999.
English translation of Form PCT/ISA/210.

* cited by examiner

Primary Examiner—Robert Chevalier
(74) Attorney, Agent, or Firm—RatnerPrestia (57) ABSTRACT

A data stream is recorded and reproduced and a recording medium for the same are adapted to record in a control track an identification mark for identifying a specific track within a unit of plural tracks by superposing the identification mark upon a control pulse. A magnetic head travels along a predetermined path in the unit of plural tracks during a high-speed playback operation by phase-locking a rotational phase signal of a cylinder with a divided signal of the control pulse having a specific phase according to the reproduced identification mark.

21 Claims, 6 Drawing Sheets

FIG. 4A Control pulse

FIG. 4B Reproduction control pulse

FIG. 4C Identification mark

FIG. 4D Eight-part dividing pulse

DATA STREAM RECORDING/REPRODUCING APPARATUS, RECORDING/REPRODUCING METHOD, AND RECORDING MEDIUM

This Application is A U.S. National Phase Application of PCT International Application PCT/JP99/01708.

FIELD OF THE INVENTION

The present invention relates to an apparatus and a method for recording and reproducing a data stream including an image and sound, and a recording medium for the same.

BACKGROUND OF THE INVENTION

In recent years, CS digital broadcastings utilizing the MPEG2 system format, including an efficiency-enhanced encoding system for moving images, has come into practice.

In the MPEG2 system, encoded image, sound, and like data are called elementary stream. The elementary stream is transmitted in a form named PES (Packetized Elementary Stream) packet. The PES packet has a structure composed of a PES header followed by a PES payload constituting a data portion.

The foregoing CS digital broadcasting utilizes a multiplex system called transport stream. In a transport stream, image, sound, and like data are transmitted by dividing and multiplexing them into a transmission unit called a transport packet having a fixed length of 188 bytes.

When recording and reproducing a data stream, which is encoded with the MPEG2 system on a magnetic tape by using a digital video tape recorder (VTR), during normal playback operation the original image is accurately reproducible, since the recorded packets are reproduced in the sequential order of the recording. In the case of high-speed playback operation, such as a high-speed search, the image can not be reproduced accurately because the packets are reproduced intermittently since a magnetic head traces only a portion of each of a plurality of recording tracks, as the head traces the tracks transversely.

Figure 6:
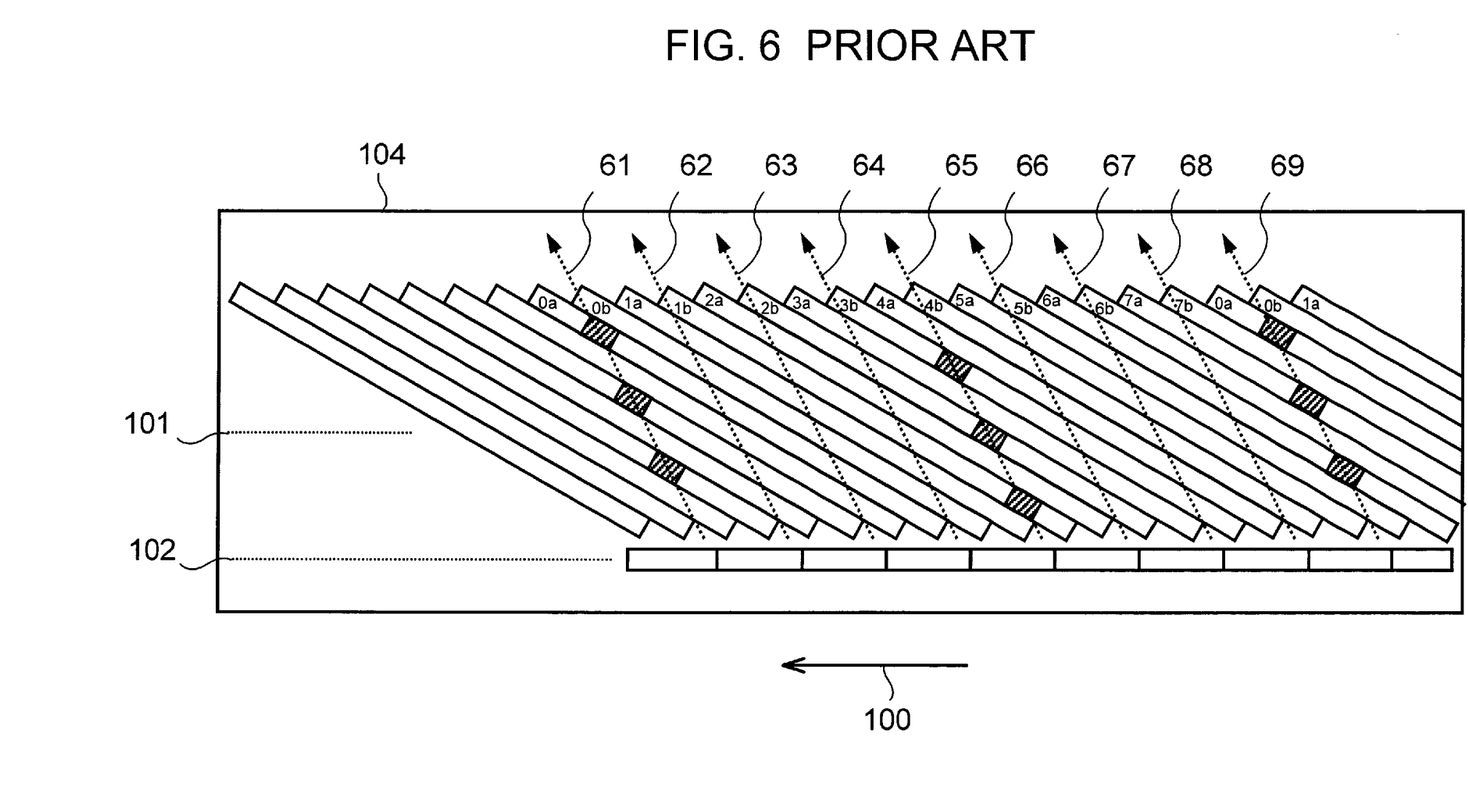
FIG. 6 is a conceptional drawing outlining recording tracks and head paths on a magnetic tape of the apparatus for recording and reproducing a data stream of the prior art.

For this reason, a technique has been devised in that an image is recorded in predetermined, discontinuous locations (rectangular areas shown by hatch lines in FIG. 6) on a plurality of tracks on a recording medium. The reproduction heads are traceable during a high-speed playback operation so that the image is reproduced by using the data, for example, as shown in FIG. 6. The rectangular areas shown by hatch lines in FIG. 6 indicate the recording tracks and arrows indicate the paths of the reproduction heads during the high-speed playback operation. FIG. 6 also shows that the image can be reproduced if a head "A", among the two reproduction heads, traces a path 61 and a head "B" traces a path 65.

One example of the above-described digital VTR of the prior art will now be described hereinafter by referring to the drawings.

Figure 5:
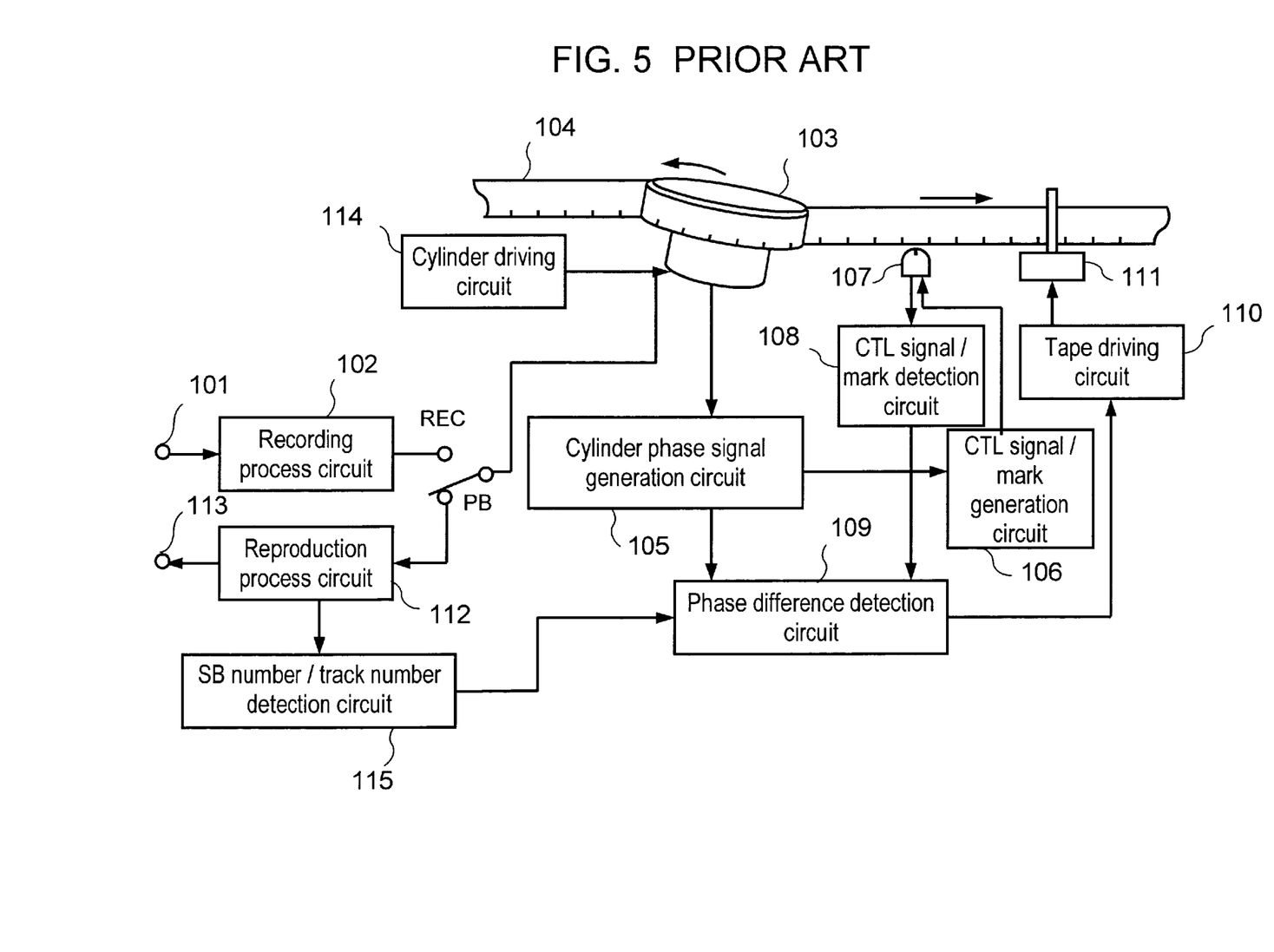
FIG. 5 is a block diagram depicting a structure of an apparatus for recording and reproducing a data stream of the prior art.

FIG. 5 depicts a diagram of a control block of the digital VTR of the prior art. The control block in FIG. 5 includes: (a) a rotary cylinder 103 (hereinafter referred to as cylinder), of which the outer periphery is provided with a plurality of magnetic recording/reproduction heads for recording and reproducing a signal, and wound for approximately 180° on the cylinder is magnetic tape 104; (b) a cylinder driving circuit 114 for driving and controlling the rotation of the cylinder 103; (c) a reproduction process circuit 112 for executing signal processing such as equalization, error correctional decoding, etc. of the signal reproduced by the magnetic recording/reproduction heads on the cylinder 103; (d) a SB number/track number detection circuit 115 for detecting numbers of a reproduction sync block and a recording track decoded by the reproduction process circuit 112; (e) a HSW signal generation circuit 105 for producing a rotational phase signal (hereinafter referred to as HSW) for the cylinder based on a rotational position signal and a rotation detecting signal of the cylinder 103; (f) a CTL head 107 for recording and reproducing a control signal (hereinafter referred to as CTL signal) on and from the magnetic tape 104; (g) a CTL signal detection circuit 108 for detecting an edge of the reproduced CTL signal; (h) a phase difference detection circuit 109 for detecting a difference in phase of the two signals input to it; and (i) a tape driving circuit 110 for executing a driving control of a capstan motor 111, which controls a travelling speed of the magnetic tape 104 based on a phasing error input from the phase difference detection circuit 109. The phase difference detection circuit 109 is also input with signals from three circuits, i.e. the SB number/track number detection circuit 115, the HSW signal generation circuit 105 and the CTL signal detection circuit 108.

The conventional digital VTR constructed as above operates in a manner, which will be described hereinafter.

A control operation in the ordinary playback mode is as follows.

The cylinder 103 rotates at a constant speed according to a control output of the cylinder driving circuit 114. The rotation causes the HSW signal generation circuit 105 to output a HSW signal. The CTL head 107 reproduces a CTL signal recorded in the magnetic tape 104 and a leading edge of the CTL signal is detected by the CTL signal detection circuit 108. The phase difference detection circuit 109 detects a difference in phase between the HSW signal and the leading edge of the CTL signal input to it.

The detected difference in phase is output as an error signal and it is supplied to the tape driving circuit 110, which in turn controls a traveling speed and a phase of the magnetic tape 104 with the capstan motor 111.

The phase control between the HSW signal and the CTL signal is thus executed by the foregoing series of feedback controls so as to maintain the reproduction heads to accurately trace the recording tracks on the magnetic tape.

A control operation in a high-speed playback mode will now be described as follows.

FIG. 6 depicts a tape pattern for the high-speed playback mode, in that arrows with dotted lines indicate the directions and locations where the magnetic heads scan through high-speed playback fields (rectangular areas shown by hatch lines) located discontinuously over a plurality of helical tracks 101, when the tape speed is octupled. Reference characters 0a through 7b in FIG. 6 identify track numbers and the "a" and "b" suffixed to the track numbers indicate corresponding azimuths of the magnetic heads during recording. In the case of the two-head azimuth system of this example, the two magnetic heads "A" and "B" record or reproduce alternately on and from the tracks and angles (azimuths) of magnetizing direction in recording and reproduction by the two heads are altered in order to reduce interference of signals between the adjoining tracks. Therefore, the track "a" recorded with the head "A" is reproducible with the head "A" but not reproducible with the head "B". The same also applies to the track "b" recorded with the head "B".

The cylinder 103 is controlled for a constant rotational speed by the cylinder driving circuit 114 based on a reference cycle (not shown in the figure) corresponding to the octuple speed of the tape. The reference cycle in this mode is nearly equal to a reference cycle for the ordinary speed or a reference cycle in the ordinary playback mode.

The magnetic tape 104 is driven by the capstan motor 111 at a speed octuple of the ordinary speed. Therefore, the CTL signal detection circuit 108 outputs a CTL signal divided by eight in order to generally equalize the cyclic period with the HSW signal, since a cycle of the reproduced CTL signal becomes one eighth of that of the ordinary playback speed.

Then, the phase difference detection circuit 109 detects a difference in phase of the CTL output signal with the HSW signal in the same manner as in the case of the ordinary playback. And, the tape driving circuit 110 performs a rotational phase control of the capstan motor 111 to automatically adjust a travelling phase of the magnetic tape 104.

Incidentally, there are eight different timings for the eight-part division, since the dividing timing for the CTL signal reproduced by the CTL signal detection circuit 108 is not specified. For this reason, a pull-in of phase may be completed while the heads are scanning through fields other than the high-speed playback fields (the areas shown by hatch lines in FIG. 6) at a rate of seven times out of eight trial operations. Referring to the head "A", for example, a path 61 along an arrow with dotted line in FIG. 6 is a regular path for the high-speed playback and paths 62 through 68 are for irregular pull-ins of the phase. Parenthetically, rectangular areas shown by hatch lines along a path 65 are reproduction fields for the head "B", but not for the head "A".

A second feedback loop using the track numbers and the SB numbers is therefore adapted in order to avoid these conditions of irregular pull-in of the phase.

A control operation in the second feedback loop will be described hereinafter.

Upon completion of an ordinary pull-in operation of the phase, the SB number/track number detection circuit 115 detects a SB number and a track number that are block numbers of image data read by the heads during scanning at the moment. Location of the scanning at that moment is uniformly determined by the SB number and the track number. Therefore, if the heads scan along the positions shown by the paths 62 through 68, the detection circuit 115 detects a deviation in number of tracks from the proper scanning position. The detected amount of phase deviation is input to the phase difference detection circuit 109, so that a phase error corresponding to the deviated number of tracks is calculated as an offset, and it is added to the phase error.

As the result, a pull-in operation of the phase is started by the second feedback loop, and the head "A" begins to scan the path 61.

An optimum head scanning for the intended high-speed playback fields is thus achieved with the two-step control operation as described above.

When shifting from ordinary playback to high-speed playback operation, the HSW signal and a dividing signal of the CTL signal are phase-locked first. The heads are then phase-locked in the correct track paths by way of detecting the SB number and the track number reproduced from the helical scanning tracks and calculating an amount of deviation of the scanning paths of the heads. Consequently, an apparatus of the prior art for recording and reproducing a data stream has a problem that it takes considerable time for shifting into high-speed playback operation, therefore, it takes a long period of time to reproduce an image in the high-speed playback operation.

SUMMARY OF THE INVENTION

An apparatus of the present invention for recording and reproducing a data stream includes: (a) a recording process means for generating, from an input data stream, a recording packet for ordinary playback and a data stream for high-speed playback and for generating a composite recording packet by inserting a recording data block within the data stream for high-speed playback into a predetermined position in the recording packet for ordinary playback; (b) a control signal generation means for generating a control signal, which is superposed with an identification mark for identifying the high-speed playback data stream; (c) a rotary cylinder provided with a magnetic head for recording and reproducing the composite recording packet on and from a magnetic tape; (d) a fixed magnetic head for recording and reproducing the control signal superposed with the identification mark on and from the magnetic tape; and (e) a control signal detection means for detecting the identification mark recorded on the magnetic tape during a high-speed playback operation.

A method of the present invention for recording and reproducing a data stream includes the steps of: (a) generating a recording packet for ordinary playback and a data stream for high-speed playback from an input data stream (a data stream input to it); (b) generating a composite recording packet by inserting a recording data block within the data stream for high-speed playback into a predetermined position in the ordinary playback recording packet; (c) generating a control signal superposed with an identification mark for identifying the high-speed playback data stream; (d) recording and reproducing the composite recording packet on and from a magnetic tape; (e) recording and reproducing the control signal superposed with the identification mark on and from the magnetic tape; and (f) detecting the identification mark recorded on the magnetic tape during a high-speed playback operation.

A recording medium of the present invention is a medium that is recorded with a composite recording packet, which is generated through the steps of: (a) generating a recording packet for ordinary playback as well as a data stream for high-speed playback from an input data stream containing image data and sound data; and (b) inserting a recording data block within the high-speed playback data stream into a predetermined position in the ordinary playback recording packet at intervals of a predetermined unit of plural tracks, wherein the recording medium is further recorded in its control track with an identification mark for identifying a specific track in each unit of the plural tracks recorded with the data stream for high-speed playback, by superposing it upon a control pulse.

Also, the identification mark for identifying the specific track in each unit of plural tracks is recorded in the control track by superposing it on the control pulse, at the same time the data stream is recorded. The magnetic head thus travels along a predetermined path within each unit of plural tracks according to the reproduced identification mark and control pulse during a high-speed playback operation.

Accordingly, the structure as described above can start reproduction and output the data stream for high-speed playback within a short period of time.

DESCRIPTION OF THE PREFERRED EMBODIMENT

First Exemplary Embodiment

Figure 1:
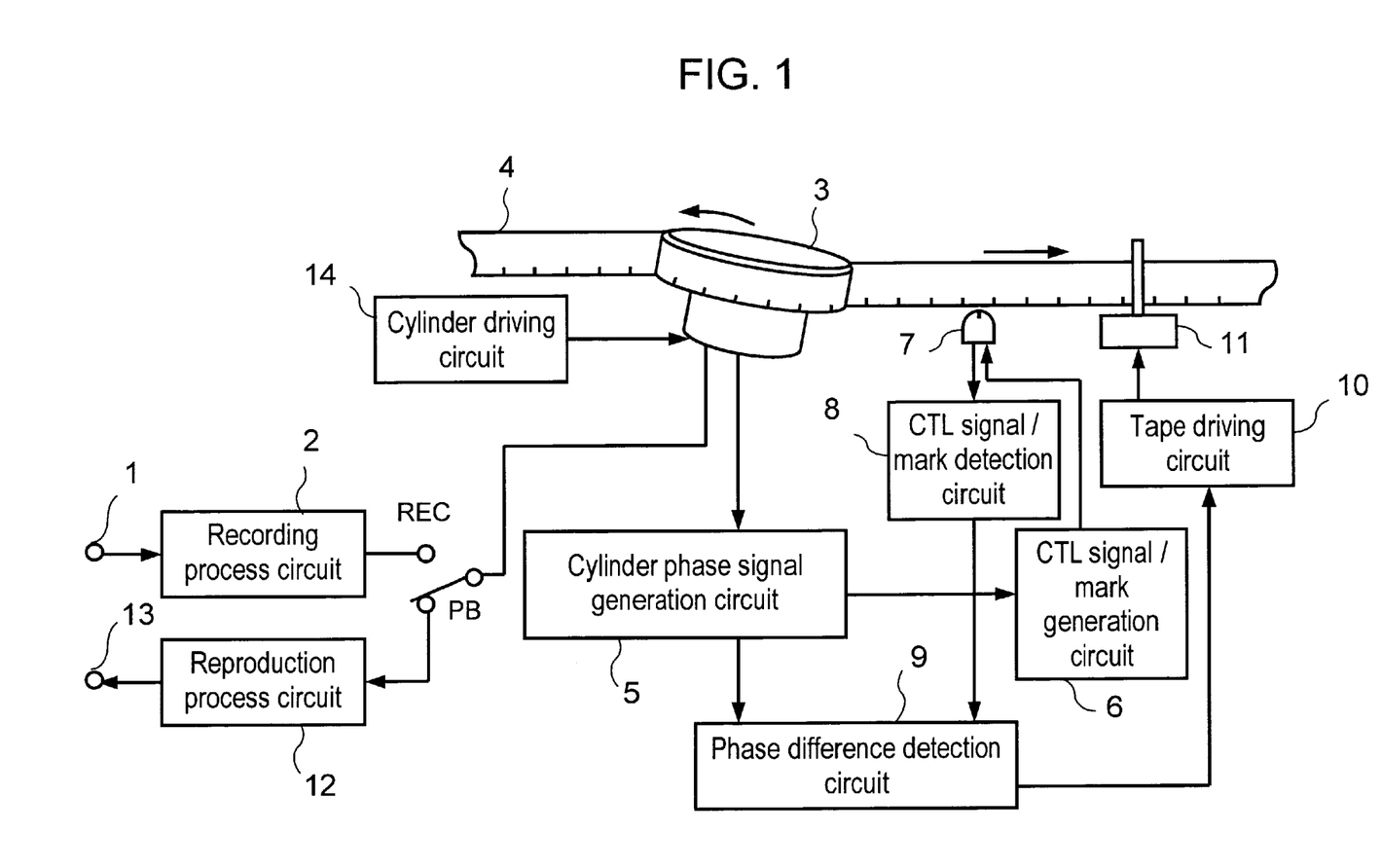
FIG. 1 is a block diagram depicting a structure of an apparatus for recording and reproducing a data stream of a first exemplary embodiment of the present invention.

An apparatus for recording and reproducing a data stream of a first exemplary embodiment of the present invention is described by referring to the drawings. FIG. 1 is a block diagram depicting a structure of an apparatus for recording and reproducing a data stream of the present exemplary embodiment.

Figure 3:
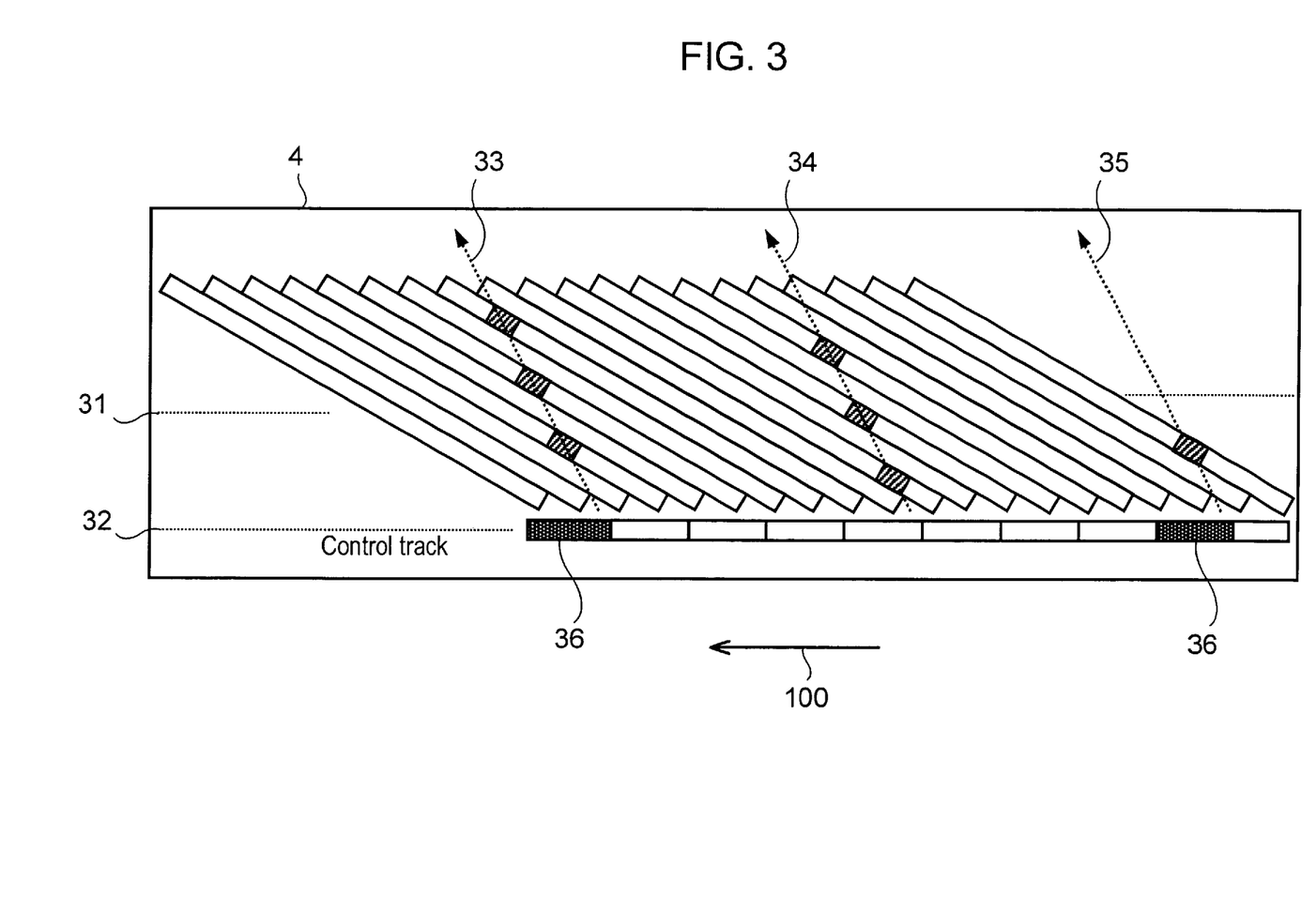
FIG. 3 is a diagrammatic drawing depicting an outline of recording tracks and head paths on a magnetic tape in the first and the second exemplary embodiments of the present invention.

Described first is an operation during recording. A data stream encoded in the MPEG2 system format and input through an input terminal 1, is input into a recording process circuit 2. The recording process circuit 2 records the input data stream into recording fields, for ordinary playback, of helical scanning tracks on a magnetic tape 4 as shown in FIG. 3 (fields other than those shown by hatch lines in FIG. 3). At the same time, the recording process circuit 2 records a data stream for high-speed playback purpose, for which an amount of data is substantially reduced by a thinning out process of frames and/or a data compression process, in recording fields for the high-speed playback (fields shown by hatch lines in FIG. 3). The recording data in each of the data streams is divided into data blocks of a predetermined size called sync blocks (hereinafter referred to as SB). Each of the SB's is affixed with a sync data signifying a leading head, an ID data representing information relating to the SB, parity data for error correction, etc. A magnetic head (not shown in the drawing) for recording is mounted on a rotary cylinder 3, so that the recording is made by the head on the helical scanning tracks.

Figure 4A:
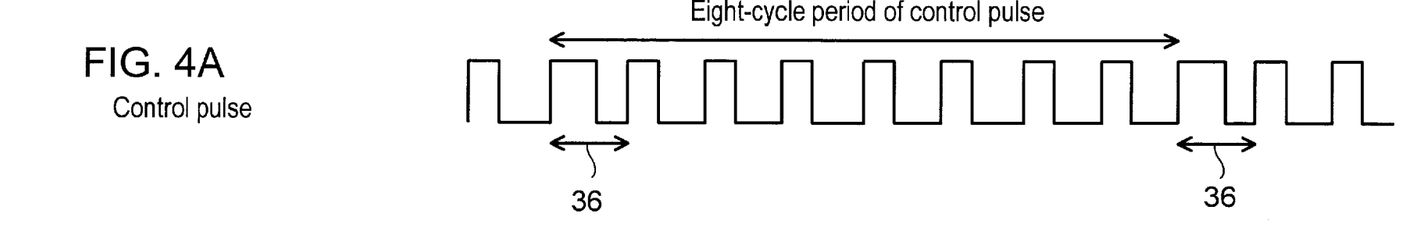
FIG. 4A is a diagrammatic drawing depicting an outline of a waveform of a recording control pulse in the first and the second exemplary embodiments of the present invention.

A CTL signal/mark generation circuit 6 generates a control pulse, which is a pulse signal of approximately 30 Hz and synchronized with the rotation of the rotary cylinder 3 and records it on the control tracks via a fixed magnetic head 7. The control track is formed in the traveling direction of the magnetic tape 4, as shown in the lower portion of FIG. 3. A duty factor of the control pulses is normally fixed at 40%, and a pulse having a duty factor of 60% is recorded as an identification mark once every plural cycles of the control pulses, in conjunction with a position of a specific track within a unit of plural tracks for high-speed playback. For example, the identification mark is superposed (multiplexed) once every eight cycles of the control pulse, if the apparatus is adapted for octuple speed fast forward playback. The recording control pulses in this instance produce a waveform as shown in FIG. 4A.

Next, an operation during playback is described. In an ordinary playback operation, a phase difference detection circuit 9 detects a difference in phase between a cylinder phase signal from a cylinder phase signal generation circuit 5 and a reproduction control signal reproduced from the control track on the magnetic tape 4 via a CTL head 7 and processed in a CTL signal/mark detection circuit 8. A tape driving circuit 10 controls a capstan motor 11 in a manner to eliminate the phase difference, thereby enabling the rotary head to trace over the helical scanning tracks accurately for reproduction of the recorded data stream. The reproduced data stream is then output from an output terminal 13 via a reproduction process circuit 12.

Figure 4B:
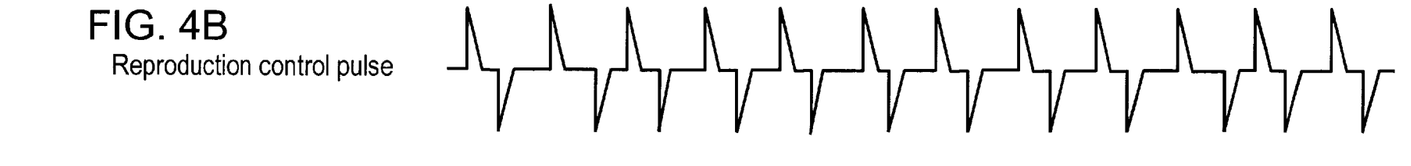
FIG. 4B is a diagrammatic drawing depicting an outline of a waveform of a reproduction control pulse in the first and the second exemplary embodiments of the present invention.
Figure 4C:
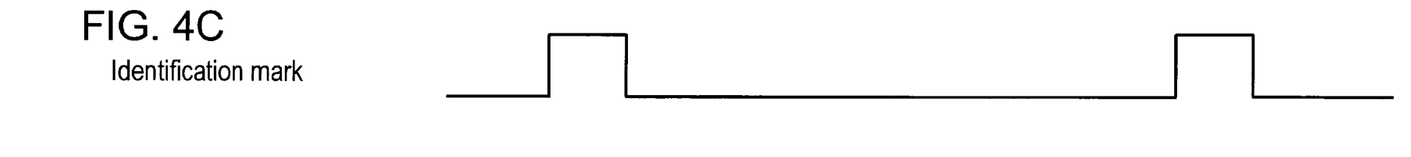
FIG. 4C is a diagrammatic drawing depicting an outline of an identification mark in the first and the second exemplary embodiments of the present invention.
Figure 4D:
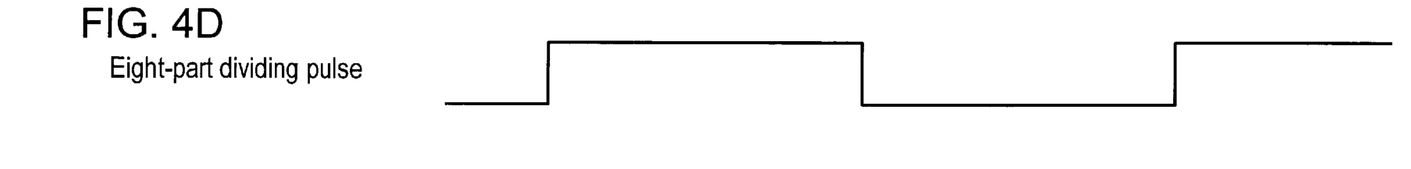
FIG. 4D is a diagrammatic drawing depicting an outline of a waveform of a dividing pulse in the first and the second exemplary embodiments of the present invention.

During a high-speed playback operation, the CTL signal/mark detection circuit 8 generates a dividing signal in a specific phase of the reproduction control signal by using the identification mark as a reference for the dividing phase. The phase difference detection circuit 9 detects a difference in phase between the dividing signal and a cylinder phase signal and controls the tape driving circuit 10, so as to cause the rotary head to accurately trace the high-speed playback fields in the helical scanning tracks. The details of a high-speed forward playback operation in octuple speed are described hereinafter, as an example. A reproduction control signal for the octuple speed has a waveform as shown in FIG. 4B. Although there can be eight different dividing pulses if the reproduction control signal is divided into eight parts at any position, an eight-part dividing pulse shown in FIG. 4D becomes the dividing pulse of the reproduction control signal by setting up a dividing phase with an identification mark shown in FIG. 4C. The identification mark (FIG. 4C) can be generated from the reproduction control signal (FIG. 4A) by using a conventional method of demodulation process for a pulse-duration modulated wave. The rotary head accurately traces paths for the octuple speed shown by arrows with dotted lines in FIG. 3, when a traveling of the tape is controlled in a manner to phase-lock the dividing pulse with the cylinder phase signal.

The data reproduced from the high-speed playback fields on the magnetic tape 4 is fed into the reproduction process circuit 12 for generating a high-speed playback data stream by extracting and reconstituting a packet for the high-speed playback, and output from the output terminal 13.

Accordingly, the identification mark is recorded by superposing it on the control pulse at a rate of once in every plurality of the control pulses, so that the rotary head is able to accurately trace the high-speed playback fields by simply phase-locking the dividing pulse of the control pulse with the cylinder phase signal by using the identification mark as the phasing reference during the high-speed playback operation, and the high-speed playback data stream is reproducible. As a result, a high-speed playback image can be output in a short period of time, when shifting the operating mode from ordinary playback to high-speed playback.

Although the foregoing is an example of the high-speed forward playback in octuple speed, the same effect is attained in any other high-speed forward playback and high-speed rewinding playback operations.

Furthermore, the same operation can be achieved with other ranges of values for the duty factor for the control pulses beside the value range specified in the foregoing.

Besides, a conventional apparatus is unable to output a high-speed playback image within a short period of time from ordinary playback operation, i.e. a distinctive feature of the present embodiment, using a recording tape produced by an apparatus of the present embodiment, since the identification mark is generated only with a variation of a trailing edge of the control pulse. The conventional apparatus, however, can reproduce the image in the same way as with a conventional recording tape. In other words, recording tapes created by an apparatus for recording and reproducing data stream of the present embodiment holds interchangeability with inferior strata as far as prerecorded tapes are concerned.

Second Exemplary Embodiment

Figure 2:
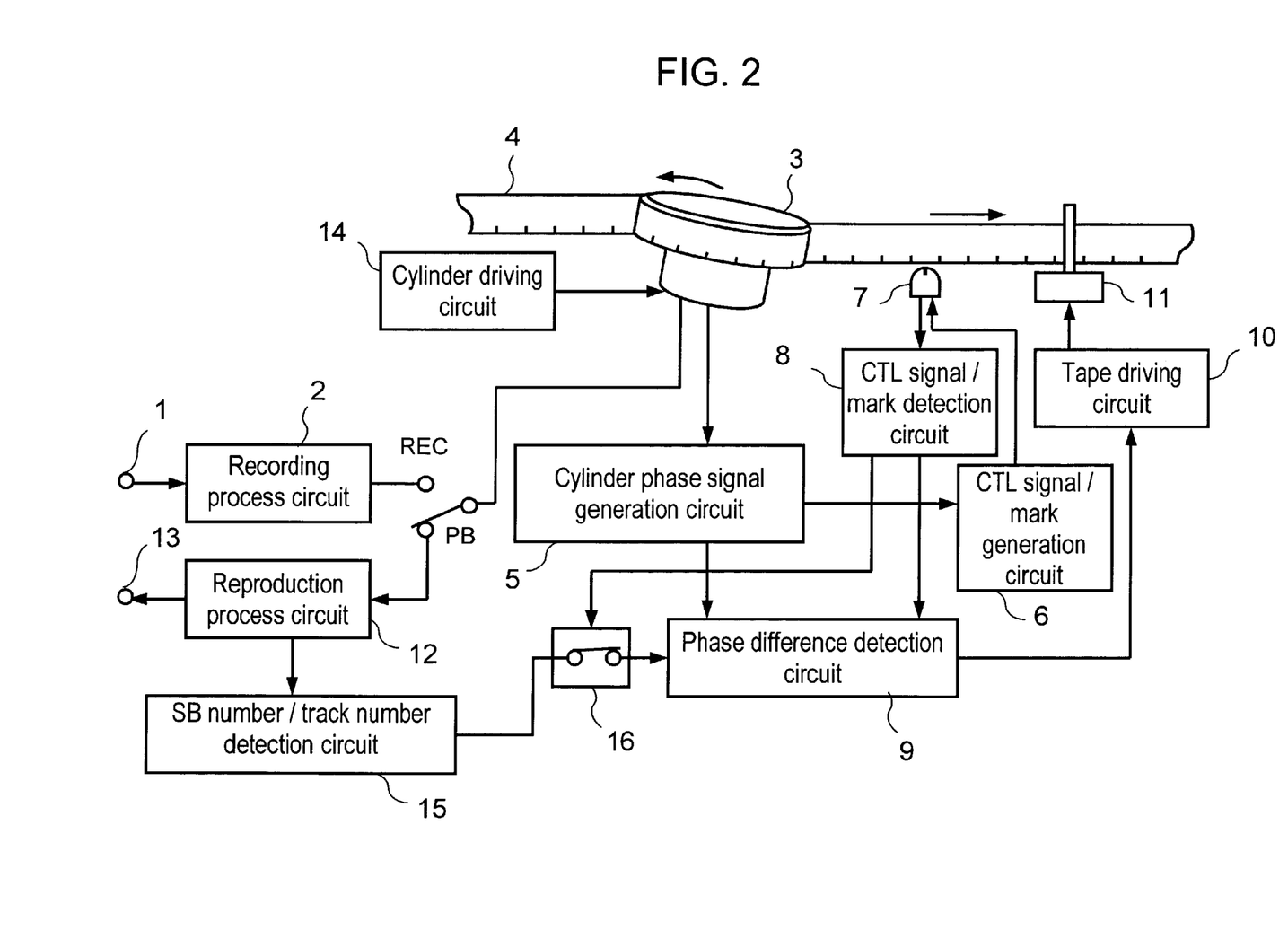
FIG. 2 is a block diagram depicting a structure of an apparatus for recording and reproducing a data stream of a second exemplary embodiment of the present invention.

An apparatus for recording and reproducing a data stream of a second exemplary embodiment of the present invention is described by referring to the drawings. FIG. 2 is a block diagram, in which a SB number/track number detection circuit 15 is added to the block diagram of FIG. 1. All other structural components and their operation will not be described, as they remain unchanged.

A recording operation and an ordinary playback operation are the same as those of the first exemplary embodiment.

During a high-speed playback operation, the CTL signal/mark detection circuit 8 detects an identification mark in a reproduction control signal, and controls a switching circuit 16 based on a result of the detection. The phase difference detection circuit 9 carries out an adjustment of traveling phase of the magnetic tape 4 by performing the same operation as that of the first exemplary embodiment without using a signal fed in from the SB number/track number detection circuit 15, when the signal output by the SB number/track number detection circuit 15 is turned off. If the CTL signal/mark detection circuit 8 does not detect an identification mark, the phase difference detection circuit 9 carries out an adjustment of traveling phase of the magnetic tape 4 with the second feedback loop by using a signal fed in from the SB number/track number detection circuit 15 in the same manner as the conventional apparatus. With the foregoing operation, the apparatus for recording and reproducing a data stream of the present exemplary embodiment can handle the high-speed playback of a prerecorded tape bearing an identification mark by making full use of a feature of this invention, as well as a conventional prerecorded tape with the conventional method. In a word, a bidirectional interchangeability of prerecorded tapes is maintained between apparatuses of the present exemplary embodiment and the prior art.

Third Exemplary Embodiment

An apparatus for recording and reproducing a data stream of a third exemplary embodiment of the present invention is described. The difference of the present embodiment from the first and the second exemplary embodiments is limited only to a set-up value for a range of the duty factor of the control pulse and a description will be made for that part only.

A supplementary information bit may be recorded in the control track by providing a plurality of ranges of the duty factor in order to record the supplementary information such as a program locating index and a time code. In the case of a supplementary information in one bit, three varieties of duty factor ranges are provided as shown in Table 1 in order to also record an identification information, so that the one bit of supplementary information is recorded beside the identification mark in the control track. In this case, the supplementary information can not be superposed on the control pulse, which is the identification mark.

TABLE 1

| Duty factor range of control pulse | One bit of supplementary information | Identification mark |
| --- | --- | --- |
| 24.5–30.5 | 1 | Not present |
| 55.0–70.0 | 0 | Not present |
| 78.5–81.5 | None | Present |

It is also possible to record one bit of supplementary information beside the identification mark in the control track, by providing four varieties of the duty factor ranges as shown in Table 2. In this case, the supplementary information can be superposed on the control pulse, regardless of presence or absence of the identification mark.

TABLE 2

| Duty factor range of control pulse (%) | One bit of supplementary information | Identification mark |
| --- | --- | --- |
| 24.5–25.5 | 1 | Not present |
| 29.5–30.5 | 1 | Present |
| 57.0–58.0 | 0 | Not present |
| 62.0–63.0 | 0 | Present |

Accordingly, the identification marks are recorded by superposing them on the control pulses at a rate of once in every plurality of the control pulses, so that the rotary head is able to accurately trace the high-speed playback fields by simply phase-locking the dividing pulse, which is formed by dividing the control pulses using the identification mark as the phasing reference during a high-speed playback operation, with the cylinder phase signal. Hence, the high-speed playback data stream is reproducible, and the high-speed playback image can be output in a short period of time, when the operating mode is shifted from ordinary playback to high-speed playback. Moreover, one bit of the supplementary information can be recorded together on the control track by providing three or four varieties of the duty factor ranges.

The same operation can be attained with any other ranges of duty factor of the control pulse, beside the above.

Fourth Exemplary Embodiment

An apparatus for recording and reproducing a data stream of a fourth exemplary embodiment of the present invention is described. The difference of the present embodiment from the first and the second exemplary embodiments is limited only to a set-up value for a range of the duty factor of the control pulse and a description will be made for that part only.

A supplementary information bit may be recorded in the control track by providing a plurality of ranges of the duty factor in order to record the supplementary information such as a program locating index and a time code. In the case of a supplementary information in two bits, five varieties of the duty factor ranges are provided as shown in Table 3 in order to also record an identification information, so that the two bits of supplementary information are recorded beside the identification mark in the control track. In this case, both of these two bits of the supplementary information can not be superposed on the control pulse, which is the identification mark.

TABLE 3

| Duty factor range of control pulse (%) | One bit of supplementary information | Identification mark |
| --- | --- | --- |
| 24.5–25.5 | 1 | 1 | Not present |
| 29.5–30.5 | 1 | 0 | Not present |
| 57.0–58.0 | 0 | 1 | Not present |
| 62.0–63.0 | 0 | 0 | Not present |
| 79.5–80.5 | None | | Present |

It is also possible to record two bits of supplementary information beside the identification mark in the control track by providing six varieties of the duty factor ranges as shown in Table 4. In this case, one bit only of the supplementary information can be superposed on the control pulse of the identification mark.

TABLE 4

| Duty factor range of control pulse (%) | Two bits of supplementary information | Identification mark |
| --- | --- | --- |
| 24.5–25.5 | 1 | 1 | Not present |
| 27.0–28.0 | 1 | None | Present |
| 29.5–30.5 | 1 | 0 | Not present |
| 57.0–58.0 | 0 | 1 | Not present |
| 59.5–60.5 | 0 | None | Present |
| 62.0–63.0 | 0 | 1 | Not present |

It is also possible to record two bits of supplementary information beside the identification mark in the control track by providing eight varieties of the duty factor ranges as shown in Table 5. In this case, two bits of the supplementary information can be superposed on the control pulse, regardless of presence or absence of the identification mark.

TABLE 5

| Duty factor range of control pulse (%) | Two bits of supplementary information | Identification mark |
| --- | --- | --- |
| 22.5–23.0 | 1 | 1 | Present |
| 24.5–25.5 | 1 | 1 | Not present |
| 27.0–28.0 | 1 | 0 | Present |
| 29.5–30.5 | 1 | 0 | Not present |
| 57.0–58.0 | 0 | 1 | Not present |
| 59.5–60.5 | 0 | 1 | Present |
| 62.0–63.0 | 0 | 0 | Not present |
| 64.5–65.5 | 0 | 0 | Present |

Fifth Exemplary Embodiment

An apparatus for recording and reproducing a data stream of a fifth exemplary embodiment of the present invention is described. In the first through the fourth exemplary embodiments, the identification mark is designated by assigning a predetermined pulse width to a pulse of specific position within a group of the control pulse train. Described further below is an example that is capable of transmitting a variety of information by a flexible means of designating an identification mark and a train of control pulses.

With regard to any one of the control pulses, a leading edge of the pulse is used as a timing reference for a traveling phase of the magnetic tape, and it is formed in an equal interval from a preceding pulse. A timing of a trailing edge of this pulse may be varied to the extent that does not adversely affect reproduction of the control pulse in the apparatus, and it can be used as a pulse-duration modulation signal. Further, the number of steps that can be made available within the pulse width may be determined by a recording and reproduction circuit, a magnetic tape and its fluctuation, a margin of detection, etc.

If two steps are made available within the pulse width, one control pulse can carry one bit of information. Likewise, four steps, eight steps, and $2^N$ steps can carry two bits, three bits, and N bits of information respectively.

On the other hand, if a recording unit for image and sound information during a high-speed playback operation in the apparatus of the first and the second exemplary embodiments is set for "m" number of the control pulses and if one control pulse can carry "n" bits of information, each of the recording units can carry (m×n) bits of information. When a group of these bits is recorded repeatedly in the control tracks, the above-mentioned recording unit can be detected unmistakably among these information. If there is a series of bits that can be synchronized, it may be used as a signal serving as an identification mark.

For example, there are 256 varieties of combination in all, in the case that a number of steps within a pulse width of the control pulses is two, i.e. "n"=1, and a number of pulses "m" of the recording unit is eight, or eight bits. Some of the series of bits that can be synchronized are shown in Table 6. That is, they shall be the series of bits whose positions can be uniquely determined among those repeating series of eight bits. It needs no saying that a series of bits is to be selected among those series of bits that can be synchronized, with a separate consideration given to easiness and reliability of detecting the synchronization.

TABLE 6

Some Combinations of Eight Bits (a vertical line | signifies a break at an end of the fourth bit.)

| Probability of synchronization | Bit series No. | Series of bits | | Bit series No. | Series of bits | |
| --- | --- | --- | --- | --- | --- | --- |
| Exist | 1 | 1000 | 0000 | 5 | 0111 | 0000 |
| | 2 | 1100 | 0000 | 6 | 0111 | 0110 |
| | 3 | 1110 | 0000 | 7 | 0111 | 1001 |
| | 4 | 1111 | 0000 | 8 | 0111 | 0110 |
| Not exist | 21 | 1010 | 1010 | 25 | 0111 | 0111 |
| | 22 | 1000 | 1000 | 26 | 0110 | 0110 |
| | 23 | 1100 | 1100 | 27 | 0011 | 0111 |
| | 24 | 1110 | 1110 | 28 | 0010 | 0010 |

The first exemplary embodiment corresponds to "1" in the Bit Series No. of Table 6, where the duty factors of 40% and 60% for a pulse width are respectively assigned with bit values of 0 and 1.

Also, ten combinations can be used for recording the supplementary information such as a program locating index, when four higher-order bits of 0111 (e.g. 5 through 8 in the Bit Series No.) is used for synchronization if an identification mark is present, and 0110 is used for synchronization if an identification mark is not present, even if the No. 25 and No. 26 having 0111 and 0110, which interfere with the synchronization, and confusing series of 1100, 1101, 0011 and 0000 are avoided out of sixteen combinations of four lower-order bits.

If the number of steps within the pulse width of the control pulses is four, i.e. "n" =2, and a number of pulses "m" of the foregoing recording unit is eight pulses, then each recording unit carries 16 bits. In this case, eight bits in the first half may be used as a control code representing synchronization and a type of information, as shown in Table 7, and eight bits in the last half may be used as a numeral information of double figures, for example. It is necessary, however, that the code representing the numeral information must be assigned in a manner not to make 0111 present.

TABLE 7

Examples of the Control Codes Representing Synchronization and Type of Information

| Code No. | Code ("x" represents 0 or 1) | | Type of information |
|---|---|---|---|
| 1 | 0111 | xxxx | Synchronization code |
| 2 | 0111 | 0xxx | Without identification mark |
| 3 | 0111 | 1xxx | With identification mark |
| 4 | 0111 | x10x | Index code |
| 5 | 0111 | x0xx | Time code |
| 51 | 0111 | x000 | Minute |
| 52 | 0111 | x001 | Hour |
| 53 | 0111 | x010 | Date |
| 54 | 0111 | x011 | Month |

Furthermore, plural types of identification marks can be represented by using some of the foregoing index codes. If the apparatus is capable of recording at any one speed selected among a plurality of speeds available for the high-speed playback, for instance, these speeds may be represented by each of the codes. Or, if the apparatus is capable of recording in response to a plurality of different speeds available for the high-speed playback simultaneously, the codes can be constituted in a way to represent them, even though they need to represent individual positions of the corresponding speeds and a composite position corresponding to them. Accordingly, they can be utilized as identification marks of various kinds.

Although the foregoing embodiments have been described with the commonly used binary code, a flexibility of the synchronization, in particular, can be further enhanced by making the best use of a feature of quaternary code, since they are actually in the quaternary code.

Also, as a matter of course, the amount of information that can be carried by the control pulses increases, as a number of steps in a pulse width increases.

INDUSTRIAL APPLICABILITY

As has been described in the foregoing, a recording and reproduction apparatus of the present invention, a method, and a recording medium for the same have the following advantages.

Since the invention records an identification mark by superposing it on a control pulse at a rate of once in every plurality of the control pulses, a rotary head is able to accurately trace high-speed playback fields by simply phase-locking a dividing pulse, which is formed by dividing the control pulses using the identification mark as the phasing reference during the high-speed playback operation, with a cylinder phase signal. Hence, it can reproduce a data stream for high-speed playback, and output images of the high-speed playback in a short period of time, when the operation is shifted from the ordinary playback to the high-speed playback. Also, a prerecorded tape can be reproduced with a conventional apparatus.

Further, the apparatus can reproduce data in a conventionally prerecorded tape, thereby attaining a bi-directional interchangeability with the conventional apparatus.

Furthermore, the present invention is able to record together one bit of supplementary information on the control track.

Or, the present invention is able to record together two bits of supplementary information on the control track.

Moreover, the present invention is able to record collectively a variety of supplementary information such as indices and a time code.

Accordingly, the present invention can achieve a substantial reduction in searching time, and improves a convenience in utilizing the apparatus by making a search for a recorded image and sound information based on an information such as indices and time on the control track during a fast-forward and a fast-rewind operations involving no playback, to say nothing of the fast-forward and the fast-rewind operations involving a playback.

What is claimed is:

1. An apparatus for recording and reproducing a data stream comprising:

(a) recording process means for generating a recording packet for ordinary playback and a data stream for hiah-speed playback from a data stream input thereto, and for generating a composite recording packet by inserting a recording data block within said data stream for high-speed playback into a predetermined position in said recording packet for ordinary playback;

(b) control signal generation means for generating a control signal, which is superposed with an identification mark for identifying said data stream for high-speed playback;

(c) a rotary cylinder provided with a magnetic head for recording and reproducing said composite recording packet on and from a helical track of a magnetic tape;

(d) a fixed magnetic head for recording and reproducing said control signal superposed with said identification mark on and from a control track of said magnetic tape; and (e) control signal detection means for detecting said identification mark recorded on said magnetic tape during a high-speed playback operation;

wherein said control signal generated by said control signal generation means is composed of a train of pulses superposed with said identification mark, and a duty factor of said identification mark differs from a duty factor of an ordinary control pulse; and wherein a plurality of ranges of duty factor are set up for said control pulses, and that one of said plurality of ranges of duty factor is assigned in relation to said identification mark, and the other ranges of duty factor are assigned in relation to a supplementary information.

2. An apparatus for recording and reproducing a data stream comprising:

(a) recording process means for generating a recording packet for ordinary playback and a data stream for high-speed playback from a data stream input thereto, and for generating a composite recording packet by inserting a recording data block within said data stream for high-speed playback into a predetermined position in said recording packet for ordinary playback;

(b) control signal generation means for generating a control signal, which is superposed with an identification mark for identifying said data stream for high-speed playback;

(c) a rotary cylinder provided with a magnetic head for recording and reproducing said composite recording packet on and from a helical track of a magnetic tape;

(d) a fixed magnetic head for recording and reproducing said control signal superposed with said identification mark on and from a control track of said magnetic tape; and (e) control signal detection means for detecting said identification mark recorded on said magnetic tape during a high-speed playback operation;

wherein said control signal generated by said control signal generation means is composed of a train of pulses superposed with said identification mark, and a duty factor of said identification mark differs from a duty factor of an ordinary control pulse; and wherein a first range and a second range of duty factor are set up for said control pulses, and that the first range of duty factor is assigned in relation to said control pulse, and the second range of duty factor is assigned in relation to said identification mark, and further wherein said identification mark is superposed upon said control pulse.

3. An apparatus for recording and reproducing a data stream comprising:

(a) recording process means for generating a recording packet for ordinary playback and a data stream for high-speed playback from a data stream input thereto, and for generating a composite recording packet by inserting a recording data block within said data stream for high-speed playback into a predetermined position in said recording packet for ordinary playback;

(b) control signal generation means for generating a control signal, which is superposed with an identification mark for identifying said data stream for high-speed playback;

(c) a rotary cylinder provided with a magnetic head for recording and reproducing said composite recording packet on and from a helical track of a magnetic tape;

(d) a fixed magnetic head for recording and reproducing said control signal superposed with said identification mark on and from a control track of said magnetic tape; and (e) control signal detection means for detecting said identification mark recorded on said magnetic tape during a high-speed playback operation;

wherein said control signal generated by said control signal generation means is composed of a train of pulses superposed with said identification mark, and a duty factor of said identification mark differs from a duty factor of an ordinary control pulse; and wherein said control signal generation means generates said train of control pulses superposed with said identification mark by pulse-duration modulating the train of control pulses with a specific code having a series of bits that can be synchronized, and that said control signal detection means detects said superposed identification mark by detecting said specific code after pulse-duration demodulating said train of control pulses during a high-speed playback operation.

4. An apparatus for recording and reproducing a data stream comprising:

(a) recording process means for generating a recording packet for ordinary playback and a data stream for high-speed playback from a data stream input thereto, and for generating a composite recording packet by inserting a recording data block within said data stream for high-speed playback into a predetermined position in said recording packet for ordinary playback;

(b) control signal generation means for generating a control signal, which is superposed with an identification mark for identifying said data stream for high-speed playback;

(c) a rotary cylinder provided with a magnetic head for recording and reproducing said composite recording packet on and from a helical track of a magnetic tape;

(d) a fixed magnetic head for recording and reproducing said control signal superposed with said identification mark on and from a control track of said magnetic tape; and (e) control signal detection means for detecting said identification mark recorded on said magnetic tape during a high-speed playback operation.

wherein said control signal generated by said control signal generation means is composed of a train of pulses superposed with said identification mark, and a duty factor of said identification mark differs from a duty factor of an ordinary control pulse;

wherein said control signal generation means generates said train of control pulses superposed with said identification mark by pulse-duration modulating the train of control pulses with a specific code having a series of bits that can be synchronized, and that said control signal detection means detects said superposed identification mark by detecting said specific code after pulse-duration demodulating said train of control pulses during a high-speed playback operation; and wherein said control signal generation means generates said train of control pulses superposed with said identification mark and a supplementary information by assigning said specific code for pulse-duration modulation of the train of control pulses to the identification mark, as well as the other codes to the supplementary information.

5. A method for recording and reproducing a data stream comprising the steps of:

(a) recording and reproducing a data stream containing an image data and a sound data in and from a helical track formed on a magnetic tape via a magnetic head, as well as recording a control pulse representing an information of travelling reference for a playback operation in a control track formed in a longitudinal direction of said magnetic tape; and (b) controlling a travelling of said magnetic tape during a playback operation based on said reproduced control pulse, (c) recording an identification mark for identifying a specific track within a unit of plural tracks in said control track by superposing it upon said control pulse; and (d) reproducing and outputting a data stream for high-speed playback by running a magnetic head along a predetermined path in the unit of plural tracks during the high-speed playback based on said reproduced identification mark and said control pulse;

wherein said identification mark is recorded by superposing it upon said control pulse by way of varying a duty factor of said control pulse; and wherein said identification mark is superposed upon said control pulses by setting up a first range and a second range of duty factor for said control pulses, and assigning:

(a) said first range of duty factor to said control pulse; and (b) said second range of duty factor to said identification mark.

6. A method for recording and reproducing a data stream comprising the steps of:
- (a) recording and reproducing a data stream containing an image data and a sound data in and from a helical track formed on a magnetic tape via a magnetic head, as well as recording a control pulse representing an information of travelling reference for a playback operation in a control track formed in a longitudinal direction of said magnetic tape;
- (b) controlling a travelling of said magnetic tape during a playback operation based on said reproduced control pulse;
- (c) recording an identification mark for identifying a specific track within a unit of plural tracks in said control track by superposing it upon said control pulse; and
- (d) reproducing and outputting a data stream for high-speed playback by running a magnetic head along a predetermined path in the unit of plural tracks during the high-speed playback based on said reproduced identification mark and said control pulse;
  - wherein said identification mark is recorded by superposing it upon said control pulse by way of varying a duty factor of said control pulse; and
  - wherein one bit of supplementary information and said identification mark are superposed upon said control pulses by setting up a first range, a second range, and a third range of duty factor for said control pulses, and assigning:
- (a) said first range of duty factor to said control pulse corresponding to 0 in one bit of supplementary information;
- (b) said second range of duty factor to said control pulse corresponding to 1 in one bit of supplementary information; and
- (c) said third range of duty factor to said identification mark.

7. A method for recording and reproducing a data stream comprising the steps of:
- (a) recording and reproducing a data stream containing an image data and a sound data in and from a helical track formed on a magnetic tape via a magnetic head, as well as recording a control pulse representing an information of travelling reference for a playback operation in a control track formed in a longitudinal direction of said magnetic tape;
- (b) controlling a travelling of said magnetic tape during a playback operation based on said reproduced control pulse;
- (c) recording an identification mark for identifying a specific track within a unit of plural tracks in said control track by superposing it upon said control pulse; and
- (d) reproducing and outputting a data stream for high-speed playback by running a magnetic head along a predetermined path in the unit of plural tracks during the high-speed playback based on said reproduced identification mark and said control pulse;
  - wherein said identification mark is recorded by superposing it upon said control pulse by way of varying a duty factor of said control pulse; and
  - wherein one bit of supplementary information and said identification mark are superposed upon said control pulses by setting up a first range, a second range, a third range and a fourth range of duty factor for said control pulses, and assigning:
- (a) said first range of duty factor to said control pulse corresponding to 0 in one bit of supplementary information;
- (b) said second range of duty factor to said identification mark corresponding to 0 in one bit of supplementary information;
- (c) said third range of duty factor to said control pulse corresponding to 1 in one bit of supplementary information; and
- (d) said fourth range of duty factor to said identification mark corresponding to 1 in one bit of supplementary information.

8. A method for recording and reproducing a data stream comprising the steps of:
- (a) recording and reproducing a data stream containing an image data and a sound data in and from a helical track formed on a magnetic tape via a magnetic head, as well as recording a control pulse representing an information of travelling reference for a playback operation in a control track formed in a longitudinal direction of said magnetic tape; and
- (b) controlling a travelling of said magnetic tape during a playback operation based on said reproduced control pulse,
- (c) recording an identification mark for identifying a specific track within a unit of plural tracks in said control track by superposing it upon said control pulse; and
- (d) reproducing and outputting a data stream for high-speed playback by running a magnetic head along a predetermined path in the unit of plural tracks during the high-speed playback based on said reproduced identification mark and said control pulse;
  - wherein said identification mark is recorded by superposing it upon said control pulse by way of varying a duty factor of said control pulse;
  - wherein two bits of supplementary information and said identification mark are superposed upon said control pulses by setting up a first range, a second range, a third range, a fourth range, a fifth range and a sixth range of duty factor for said control pulses, and assigning:
- (a) said first range of duty factor to, said control pulse corresponding to 0 in one bit of a first supplementary information and 0 in one bit of a second supplementary information;
- (b) said second range, of duty factor to said control pulse corresponding to 0 in one bit of the first supplementary information and 1 in one bit of the second supplementary information;
- (c) said third range of duty factor to said identification mark corresponding to 0 in one bit of the first supplementary information;
- (d) said fourth range of duty factor to said control pulse corresponding to 1 in one bit of the first supplementary information and 0 in one bit of the second supplementary information;
- (e) said fifth range of duty factor to said control pulse corresponding to 1 in one bit of the first supplementary information and 1 in one bit of the second supplementary information; and
- (f) said sixth range of duty factor to said identification mark corresponding to 1 in one bit of the first supplementary information.

9. A method for recording and reproducing a data stream comprising the steps of:
- (a) recording and reproducing a data stream containing an image data and a sound data in and from a helical track formed on a magnetic tape via a magnetic head, as well as recording a control pulse representing an information of travelling reference for a playback operation in a control track formed in a longitudinal direction of said magnetic tape; and
- (b) controlling a travelling of said magnetic tape during a playback operation based on said reproduced control pulse,
- (c) recording an identification mark for identifying a specific track within a unit of plural tracks in said control track by superposing it upon said control pulse; and
- (d) reproducing and outputting a data stream for high-speed playback by running a magnetic head along a predetermined path in the unit of plural tracks during the high-speed playback based on said reproduced identification mark and said control pulse;
  - wherein said identification mark is recorded by superposing it upon said control pulse by way of varying a duty factor of said control pulse; and
  - wherein two bits of supplementary information and said identification mark are superposed upon said control pulses by setting up a first range, a second range, a third range, a fourth range, a fifth range, a sixth range, a seventh range and an eighth range of duty factor for said control pulses, and assigning:
- (a) said first range of duty factor to said control pulse corresponding to 0 in one bit of a first supplementary information and 0 in one bit of a second supplementary information;
- (b) said second range of duty factor to said control pulse corresponding to 0 in one bit of the first supplementary information and 1 in one bit of the second supplementary information;
- (c) said third range of duty factor to said identification mark corresponding to 0 in one bit of the first supplementary information and 0 in one bit of the second supplementary information;
- (d) said fourth range of duty factor to said identification mark corresponding to 0 in one bit of the first supplementary information and 1 in one bit of the second supplementary information;
- (e) said fifth range of duty factor to said control pulse corresponding to 1 in one bit of the first supplementary information and 0 in one bit of the second supplementary information;
- (f) said sixth range of duty factor to said control pulse corresponding to 1 in one bit of the first supplementary information and 1 in one bit of the second supplementary information;
- (g) said seventh range of duty factor to said identification mark corresponding to 1 in one bit of the first supplementary information and 0 in one bit of the second supplementary information; and
- (h) said eighth range of duty factor to said identification mark corresponding to 1 in one bit of the first supplementary information and 1 in one bit of the second supplementary information.

10. A method of recording and reproducing a data stream comprising the steps of:
- (a) generating a recording packet for ordinary playback and a data stream for high-speed playback from a data stream input therein;
- (b) generating a composite recording packet by inserting a recording data block within said data stream for high-speed playback into a predetermined position in said recording packet for ordinary playback;
- (c) generating a control signal superposed with an identification mark for identifying said data stream for high-speed playback;
- (d) recording and reproducing said composite recording packet in and from a helical track on a magnetic tape;
- (e) recording and reproducing said control signal superposed with the identification mark in and from a control track on said magnetic tape; and
- (f) detecting said identification mark recorded on said magnetic tape during a high-speed playback operation;
  - wherein a plurality of ranges of duty factor are set up for said control pulses, and that one of said plurality of ranges of duty factor is assigned in relation to said identification mark, and the other ranges of duty factor are assigned in relation to a supplementary information.

11. A recording medium comprising:
- (a) a composite recording packet in a helical track, said composite recording packet being generated through the steps of (i) generating a recording packet for ordinary playback as well as a data stream for hiah-speed playback from a data stream containing an image data and sound data, and (ii) inserting a recording data block within said data stream for hiah-speed playback into a predetermined position in said recording packet for ordinary playback; and
- (b) a train of control pulses in a control track, said control pulses being superposed with an identification mark for identifying said data stream for high-speed playback;
- wherein said train of control pulses includes a plurality of ranges of duty factor, and said recording medium is recorded with said train of control pulses, for which one of said plurality of ranges of duty factor is assigned in relation to said identification mark, and the other ranges of duty factor are assigned in relation to a supplementary information.

12. A recording medium comprising:
- (a) a composite recording packet in a helical track, said composite recording packet being generated through the steps of (i) generating a recording packet for ordinary playback as well as a data stream for high-speed playback from a data stream containing an image data and sound data, and (ii) inserting a recording data block within said data stream for high-speed playback into a predetermined position in said recording packet for ordinary playback; and
- (b) a train of control pulses in a control track, said control pulses being superposed with an identification mark for identifying said data stream for high-speed playback;
  - wherein said identification mark is superposed upon said control pulse by (i) pulse-duration modulating said train of control pulses with a code having a specific series of bits, and (ii) assigning the specific code to said identification mark.

13. A recording medium comprising:
- (a) a composite recording packet in a helical track, said composite recording packet being generated through the steps of (i) generating a recording packet for ordinary playback as well as a data stream for high-speed playback from a data stream containing an image data and sound data, and (ii) inserting a recording data block within said data stream for high-speed playback into a predetermined position in said recording packet for ordinary playback; and (b) a train of control pulses in a control track, said control pulses being superposed with an identification mark for identifying said data stream for high-speed playback, wherein said identification mark and a supplementary information are superposed upon said control pulses by (i) assigning a specific code for pulse-duration modulation of said train of control pulses to said identification mark, and (ii) assigning the other codes to the supplementary information.

14. The apparatus for recording and reproducing a data stream according to claim 1, further comprising:

(a) cylinder phase signal generation means for detecting and outputting a rotational phase of said rotary cylinder;

(b) phase difference detection means for detecting a difference in phase between an output of said cylinder phase signal generation means and an output of said control signal detection means; and (c) tape driving control means for controlling a travel of said magnetic tape based on a phase difference signal from said phase difference detection means.

15. The apparatus for recording and reproducing a data stream according to claim 2, further comprising:

(a) cylinder phase signal generation means for detecting and outputting a rotational phase of said rotary cylinder;

(b) phase difference detection means for detecting a difference in phase between an output of said cylinder phase signal generation means and an output of said control signal detection means; and (c) tape driving control means for controlling a travel of said magnetic tape based on a phase difference signal from said phase difference detection means.

16. The apparatus for recording and reproducing a data stream according to claim 3, further comprising:

(a) cylinder phase signal generation means for detecting and outputting a rotational phase of said rotary cylinder;

(b) phase difference detection means for detecting a difference in phase between an output of said cylinder phase signal generation means and an output of said control signal detection means; and (c) tape driving control means for controlling a travel of said magnetic tape based on a phase difference signal from said phase difference detection means.

17. The apparatus for recording and reproducing a data stream according to claim 4, further comprising:

(a) cylinder phase signal generation means for detecting and outputting a rotational phase of said rotary cylinder;

(b) phase difference detection means for detecting a difference in phase between an output of said cylinder phase signal generation means and an output of said control signal detection means; and (c) tape driving control means for controlling a travel of said magnetic tape based on a phase difference signal from said phase difference detection means.

18. The apparatus for recording and reproducing a data stream according to claim 1, further comprising:

(a) reproduction process means for decoding a signal reproduced by said magnetic head on the rotary cylinder; and (b) SB number/track number detection means for detecting the decoded signal from said reproduction process means,
wherein said phase difference detection means carries out an adjustment of traveling phase of the magnetic tape with a second feedback loop by using a signal fed from said SB number/track number detection means, where said control signal detection means does not detect said identification mark during a high-speed playback operation.

19. The apparatus for recording and reproducing a data stream according to claim 2, further comprising:

(a) reproduction process means for decoding a signal reproduced by said magnetic head on the rotary cylinder; and (b) SB number/track number detection means for detecting the decoded signal from said reproduction process means,
wherein said phase difference detection means carries out an adjustment of traveling phase of the magnetic tape with a second feedback loop by using a signal fed from said SB number/track number detection means, where said control signal detection means does not detect said identification mark during a high-speed playback operation.

20. The apparatus for recording and reproducing a data stream according to claim 3, further comprising:

(a) reproduction process means for decoding a signal reproduced by said magnetic head on the rotary cylinder; and (b) SB number/track number detection means for detecting the decoded signal from said reproduction process means,
wherein said phase difference detection means carries out an adjustment of traveling phase of the magnetic tape with a second feedback loop by using a signal fed from said SB number/track number detection means, where said control signal detection means does not detect said identification mark during a high-speed playback operation.

21. The apparatus for recording and reproducing a data stream according to claim 4, further comprising:

(a) reproduction process means for decoding a signal reproduced by said magnetic head on the rotary cylinder; and (b) SB number/track number detection means for detecting the decoded signal from said reproduction process means,
wherein said phase difference detection means carries out an adjustment of traveling phase of the magnetic tape with a second feedback loop by using a signal fed from said SB number/track number detection means, where said control signal detection means does not detect said identification mark during a high-speed playback operation.

* * * * *

UNITED STATES PATENT AND TRADEMARK OFFICE
CERTIFICATE OF CORRECTION

PATENT NO. : 6,711,345 B1
APPLICATION NO. : 09/424813
DATED : March 23, 2004
INVENTOR(S) : Tohyama et al.

Page 1 of 1

It is certified that error appears in the above-identified patent and that said Letters Patent is hereby corrected as shown below:

On the title page, Item (30) Foreign Application Priority Data, "Mar. 21, 1998" should read --Mar. 31, 1998--.

In column 20, line 2, claim 18, "according to claim 1" should read --according to claim 14--.

In column 20, line 17, claim 19, "according to claim 2" should read --according to claim 15--.

In column 20, line 32, claim 20, "according to claim 3" should read --according to claim 16--.

In column 20, line 47, claim 21, "according to claim 4" should read --according to claim 17--.

Signed and Sealed this

Fifteenth Day of September, 2009

David J. Kappos
*Director of the United States Patent and Trademark Office*